Patented Nov. 26, 1935

2,022,482

UNITED STATES PATENT OFFICE 2,022,482

STORAGE BATTERY PASTE

Alexander Stewart, Roselle, N. J., assignor to National Lead Company, New York, N. Y., a corporation of New Jersey No Drawing. Application March 4, 1932,
Serial No. 596,903

9 Claims. (Cl. 136—26)

The object of this invention is the improvement of the capacity discharge of lead storage batteries, and consists in the use of so-called waste sulphite liquor or certain products thereof as an addition agent to the active material or paste in such batteries, as pointed out below.

Waste sulphite liquor is a by-product of paper mills obtained by digesting spruce or other coniferous wood chips under pressure in closed digesters with a solution of calcium bisulphite sometimes containing magnesium bisulphite and sodium bisulphite. During the process the bisulphite liquor dissolves and decomposes approximately half of the wood, that is to say, all the non-fibrous part, leaving cellulose, which is used for manufacturing paper and other products. On discharge from the digester, the cellulose residue is washed with water and the liquid part of the charge, including the washing, is known as waste sulphite liquor. Its chemical composition is complex and uncertain, the organic matter therein being combined with the calcium and sulphur dioxide from the digesting liquor. These liquors contain from 10–12% of solids and are commonly concentrated, for sale, by evaporation to a content of approximately 50% solids, or further evaporated to a desiccated powder and sold in that form.

I have discovered that this material, which will be herein referred to as organic matter, forms a valuable addition agent for the active material of lead storage batteries. When incorporated in small amounts in such active material, the capacity and life of the plate are remarkably increased generally, and particularly at the low temperatures experienced by motor vehicle batteries in the winter months.

I am aware that it has been proposed heretofore to use wood-flour and other powdered vegetable matter in the dry and natural state, also so-called lignin, a water insoluble residue, produced by treating wood and like materials with strong sulphuric acid, washing out the soluble material with water, discarding the soluble portion and drying and grinding the residue, which is added to the active material. In contradistinction to such practice, the addition agent of this invention, is constituted essentially of decomposition products of wood, or calcium and sulphur compounds of wood, chemically combined, which are water soluble and can be precipitated out of solution by the use of water-soluble lead salts or oxides of lead with which they appear to combine, forming something in the nature of chemical compounds with lead that are apparently colloidal in character and in some cases, gelatinous; further, these water-soluble decomposition products may be recovered by evaporation and roasting in a suitable furnace, as later pointed out, and in all cases exercise a beneficial influence on the battery. While the greatest advantage is obtained by adding this organic matter to the negative plate, I do not restrict myself to the negative plate, for as desired, and as conditions may warrant, it may be incorporated also in the positive plate.

Litharge is the chief constituent of the active material of the negative plate in lead storage batteries and a desirable quality for good battery litharge is that it should have a relatively high acid absorption number. The acid absorption number is an arbitrary index of the reactive properties of the litharge and is ordinarily expressed in milligrams of sulphuric acid absorbed by a given weight of the litharge in a given time at a given temperature. I have found that with a litharge having a relatively low acid absorption number, when it has added to it as little as 0.50% of said organic matter, either directly or in the form of the lead organic compound referred to, the acid absorption number will be materially increased, often as much as 20%. Also, small additions of this agent appear to permit a greater dispersion of active lead oxide and this results in higher capacity, and further, the indications are that this organic matter, thus associated or combined with the lead salts, oxides and metallic sponge lead of the active material, acts as a protective colloid therefor, hindering their growth to coarse grained crystals. It is known that the formation of lead sulphate in a coarse crystalline form, results in deterioration of the plate.

The invention may be carried out in various ways of which the following are examples:

The solid organic content is precipitated from the liquor, either in its original strength or in concentrated form or as a solution made up from the dry powder, with a neutral solution of lead acetate, the addition of which precipitates substantially all of the organic matter, in the form of the lead compound above referred to. The lead acetate dissolved in water is added until, by an outside indicator, lead is shown to be in a slight excess. The amount of free acetic acid formed is calculated and neutralized with caustic soda. This precipitate is gelatinous and apparently colloidal in character, and it is only with difficulty that the soluble salts are washed out with water, leaving an insoluble product. The latter is dried at say 95° C. and ground to pass a 200 mesh and then worked into negative plate paste in such proportions that the final paste contains substantially 0.10% to 5% of the contained organic matter, by weight.

2

A similar result is obtained by adding the liquor or its concentrate to water containing finely divided litharge, causing precipitation, until there is an excess of organic matter, then filtering and washing out the excess of such matter with water. The precipitate thus formed is not quite as gelatinous as the precipitate obtained with lead acetate. It is dried, ground and added to the paste in the same manner as above and in the same proportion and with effect already stated.

Analysis for lead content of composite samples, prepared as described above, are as follows:

*Precipitate obtained with lead acetate*

Lead content_____31.34%

*Precipitate obtained with lead oxide (PbO)*

Lead content_____34.15%

3

It is possible also to produce this addition agent by precipitation out of waste sulphite liquor by adding thereto a mineral acid, preferably sulphuric acid, in amounts sufficient to form a concentration of about 20% by volume. The precipitate containing organic matter thus produced is then filtered out and neutralized as to its excess acid by adding litharge to it, resulting in a product or compound which when dried and ground will contain about 10% of the organic matter and 90% lead sulphate and lead oxide, either free or combined with the organic matter. This is then added to the paste in such proportions that the latter will contain from about .1% to 5% of the organic matter that was in the sulphite liquor.

It has been determined that certain elements in said organic material, which may be waxes and resins, have a tendency to retard the forming process of the negative plate. By the precipitation above described these elements are rendered ineffective, thereby not only improving the efficiency but also and at the same time eliminating all tendency of the electrolyte to foam objectionably during the forming or charging process.

4

This undesirable part of the organic matter in the original liquor can also be rendered ineffective by carefully roasting the dry powder, recovered by evaporation from the liquor, in a suitable furnace, preferably in a non-oxidizing atmosphere and at a temperature of say, between 270° C. and 330° C. for a period of about two hours. A satisfactory test for the destruction in this way of these elements or of their objectionable qualities is by shaking a small portion of the material in 10% sulfuric acid and observing when the resulting froth or foam appears to be unstable, at which time the roasting can be stopped. After cooling, the resulting powder is ready to be mixed into the paste, being then less water-soluble according to the extent of roasting.

Results have shown, that when the roasting is conducted in the presence of some of the other components of the ultimate paste, such as barium sulphate, lead sulphate or litharge, and in such proportions that the finished roasted product contains from say 10% to 50% organic matter, it produces a very desirable admixture, which is readily mixed into the paste material. The roasted product is added in such proportion that the final paste contains substantially 0.1% to 5% organic matter by weight.

In each of the preceding examples of this invention the process of producing the paste actually begins with the digestion of the wood but as the sulphite liquor is easily and cheaply obtainable I prefer to use it as it comes from the paper mill either as liquor or dry, thereafter treating it, in one of the ways above indicated and then mixing it into the other paste components. Any of the usual additional ingredients such as barium sulphate, carbon black, etc. can be used in the paste as desired, these being unaffected by my addition agent, and not affecting it.

It will be understood that where the roasting treatment is employed it may, if desired, and according to available manufacturing facilities, be conducted as a prolongation of the evaporating and drying process, the degree of heat and the time being simply carried far enough to produce also the roasting in one continuous process.

I claim:

1. Active material for lead storage battery plates comprising lead oxide containing therein a small portion of solid organic material precipitated from waste sulfite liquor by the action of a water soluble lead compound therein.

2. A lead storage battery plate having incorporated in its active material a small portion of roasted solid residue of waste sulfite liquor.

3. The process of manufacturing storage battery paste which comprises precipitating the solid matter in waste sulphite liquor and mixing the same with lead oxide in proportion to produce a content of between .1% and 5% of organic material therein.

4. The process of manufacturing storage battery paste which comprises precipitating the solid matter in waste sulfite liquor by means of a mineral acid and mixing such matter with lead oxide.

5. The process of manufacturing storage battery paste which comprises precipitating the solid matter in waste sulfite liquor by means of lead oxide and mixing the precipitate with lead oxide to form such paste.

6. The process of making lead storage battery active material which consists in roasting the solid content of waste sulfite liquor until it becomes incapable of making stable foam and adding such product to lead oxide paste.

7. Active material for the plates of lead storage batteries comprising a paste of lead oxide with a small portion of the solid residue of waste sulphite liquor homogeneously incorporated therein.

8. Active material for lead storage battery plates comprising lead oxide having homogeneously incorporated therewith a small portion of the solid residue of waste sulphite liquor deprived of its foam-making characteristics.

9. Active material for lead storage battery plates composed of lead oxide homogeneously mixed with a small percentage of a material resulting from the treatment of wood with a solution of calcium bisulphite.

ALEXANDER STEWART.